United States Patent
Schlick

(10) Patent No.: US 12,152,738 B2
(45) Date of Patent: Nov. 26, 2024

(54) STATION

(71) Applicant: Cavagna Group S.p.A., Viadana die Calvisano (IT)

(72) Inventor: Bernard Schlick, Calcinato (IT)

(73) Assignee: Cavagna Group S.p.A., Brescia (IT)

( * ) Notice: Subject to any disclaimer, the term of this patent is extended or adjusted under 35 U.S.C. 154(b) by 0 days.

(21) Appl. No.: 18/390,498

(22) Filed: Dec. 20, 2023

(65) Prior Publication Data

US 2024/0125436 A1 Apr. 18, 2024

Related U.S. Application Data

(63) Continuation of application No. 16/609,524, filed as application No. PCT/EP2018/060662 on Apr. 26, 2018, now Pat. No. 11,867,361.

(30) Foreign Application Priority Data

May 5, 2017 (CN) .......................... 201720499785.0

(51) Int. Cl.
*F17D 1/04* (2006.01)
*F17D 5/06* (2006.01)
(Continued)

(52) U.S. Cl.
CPC ................. *F17D 1/04* (2013.01); *F17D 5/06* (2013.01); *F16L 58/188* (2013.01); *F16L 59/12* (2013.01); *F16L 59/123* (2013.01); *F16L 59/161* (2013.01); *F17C 2205/0111* (2013.01); *F17C 2205/0338* (2013.01); *F17C 2265/068* (2013.01)

(58) Field of Classification Search
CPC ...... F17D 1/04; F17D 5/06; F17C 2205/0111; F17C 2205/0338; F17C 2265/068; F16L 58/188; F16L 59/161; F16L 59/12; F16L 59/123
USPC .......... 137/358, 343, 366, 382, 377, 346.18, 137/246.19, 294, 371, 374, 624.16, 800; 220/2.2, 3.3, 4.02, 4.21, 4.22, 481, 3.8, 220/692
See application file for complete search history.

(56) References Cited

U.S. PATENT DOCUMENTS

| | | |
|---|---|---|
| 2,528,735 A | 11/1950 | Bristol |
| 3,037,392 A | 6/1962 | Sullivan |

(Continued)

FOREIGN PATENT DOCUMENTS

| | | |
|---|---|---|
| AU | 744828 B2 | 10/1999 |
| CN | 207316168 U | 5/2018 |

(Continued)

*Primary Examiner* — Minh Q Le
(74) *Attorney, Agent, or Firm* — The Webb Law Firm

(57) ABSTRACT

A gas station for delivery of gas to appliances comprising a casing and a gas regulation device comprising at least a gas regulator and a filter. The gas regulation device is mounted within the casing which comprises a ground plate and a cover element secured onto the ground plate. The ground plate is configured for mounting to a wall or an external mounting post and comprises at least one spacer, so that the ground plate is attached to the wall or the external mounting post in such a way that a predefined gap is maintained between the ground plate and the wall or between the ground plate and the mounting post. The ground plate includes a flap which supports the gas regulation device and the cover element and a hook configured to hook the cover element in the ground plate via a locking element.

20 Claims, 6 Drawing Sheets

(51) Int. Cl.
*F16L 58/18* (2006.01)
*F16L 59/12* (2006.01)
*F16L 59/16* (2006.01)

(56) References Cited

U.S. PATENT DOCUMENTS

| | | | |
|---|---|---|---|
| 3,451,580 | A | 6/1969 | Husby |
| 4,669,305 | A | 6/1987 | Rivero-Olmedo |
| 4,783,623 | A | 11/1988 | Edwards et al. |
| 4,852,403 | A | 8/1989 | Bednarz |
| 5,207,595 | A | 5/1993 | Learmont et al. |
| 5,364,290 | A | 11/1994 | Hartman |
| 5,398,711 | A | 3/1995 | Ardrey, Jr. |
| 5,440,477 | A | 8/1995 | Rohrberg et al. |
| 5,823,577 | A | 10/1998 | Johnston |
| 5,957,156 | A | 9/1999 | Hartley |
| 5,959,243 | A | 9/1999 | Thiel |
| 6,041,812 | A | 3/2000 | Hilbers |
| 6,062,254 | A | 5/2000 | Brady et al. |
| 6,260,725 | B1 | 7/2001 | Gonzales et al. |
| 6,782,915 | B2 | 8/2004 | Van Wie |
| 7,077,281 | B2 | 7/2006 | Sato et al. |
| 7,148,420 | B1 | 12/2006 | Johnson et al. |
| 7,915,528 | B2 | 3/2011 | Ni |
| 8,648,264 | B2 | 2/2014 | Masumoto |
| 2009/0000302 | A1 | 1/2009 | Edwards et al. |
| 2015/0049452 | A1 | 2/2015 | Franck et al. |
| 2015/0068621 | A1 | 3/2015 | Conner et al. |
| 2015/0197924 | A1 | 7/2015 | Whitehead et al. |
| 2018/0371782 | A1 | 12/2018 | Harada et al. |
| 2019/0017645 | A1 | 1/2019 | Fiedler et al. |
| 2019/0390791 | A1 | 12/2019 | Beaugier et al. |

FOREIGN PATENT DOCUMENTS

| | | |
|---|---|---|
| EP | 0561714 A2 | 9/1993 |
| EP | 2762900 A1 | 8/2014 |
| GB | 702424 A | 1/1954 |
| GB | 2531157 A | 4/2016 |
| JP | H7270266 A | 10/1995 |
| JP | 201379762 A | 5/2013 |
| JP | 5897860 B2 | 4/2016 |
| WO | 9951943 A1 | 10/1999 |

STATION

CROSS-REFERENCE TO RELATED APPLICATIONS

This application is a continuation of U.S. patent application Ser. No. 16/609,524 filed on Apr. 26, 2018, which is the United States national phase of International Application No. PCT/EP2018/060662 filed Apr. 26, 2018, and which claims priority to Chinese Patent Application No. 2017204997850 filed May 5, 2017, the disclosures of which are hereby incorporated by reference in their entireties.

BACKGROUND OF THE INVENTION

Field of the Invention

The invention relates to a gas station for delivery of gas to appliances, in particular in a building.

Description of Related Art

Gas stations for the (regulated) delivery of gas to different appliances in a building are well-known. Such gas stations comprise usually a gas regulator, one or more valves and other elements for regulating and delivery of the gas (such as a filter and/or manometer). A general problem of such a gas station is that the maintenance is often rather cumbersome. In cases, where the gas station is comparatively easy to access, the possibility for misuse of the device is rather high.

It is therefore an object of the present invention to provide a gas station for the delivery of gas to appliances, in particular in a building, wherein the gas station is easy to maintain and access. In particular, misuse of the gas station should be impeded or hindered.

SUMMARY OF THE INVENTION

In particular, the object is solved by a gas station for delivery of gas to appliances, in particular in a building, the gas station comprising a casing and a gas regulation device with several components comprising at least a gas regulator and one filter, wherein the gas regulation device is mounted or mountable within the casing, wherein the casing comprises a ground plate and a cover element being securable or secured onto the ground plate, wherein the ground plate is configured for mounting to a wall or to an external mounting post.

A core idea of the present invention is to provide a structure with the ground plate and the cover, wherein the ground plate can be mounted to the wall or the external mounting post. At the same time, the gas regulation device is protected within the casing. As a result, maintenance and access of the gas station is comparatively easy, whereas a potential misuse of the gas station is (at least to some degree) hindered.

Preferably, the ground plate is provided as attachment basis for the gas regulation device, which comprises a gas regulator and/or at least one filter, in particular at least one cartridge filter, and/or at least one valve and/or at least one manometer and/or at least one dielectric link insulation, so that the gas regulation device may be preassembled on the ground plate. Such a modular layout simplifies the assembly of the gas station, since the preassembly of the components of the gas regulation device may be performed in a reliable production process in a factory. With this, a reliable and fast installation process can be achieved. Further, components may easily be individually disassembled and replaced after mounting of the preassembled gas station.

Preferably, the ground plate comprises at least one fastening element, in particular at least one hole, in particular at least two or at least three holes, for fastening, in particular screwing, the gas station on the wall. With such a structure, the gas station can be reliably attached to the wall or to the mounting post.

It is further preferred that the cover element is (or can be) securely attached and locked onto the ground plate. This feature may aid in preventing unauthorized access to the gas station.

Furthermore, it may be preferred that that the ground plate is made of an insulating material, in particular is made of plastic, in order to insulate the gas regulation device from electric charges which might otherwise be transmitted from the wall or the external mounting post onto the gas regulation device. This increases the safety of the gas station. Furthermore, corrosion of the piping elements which may arise due to static charges accumulated in the gas station may be prevented.

In an embodiment, the ground plate comprises at least one spacer, so that the ground plate is attached to the wall or to the external mounting post in such a way that a predefined gap is maintained between the ground plate and the wall or between the ground plate and the mounting post. The ground plate may further comprise ventilation means in order to guide any leakage gas in the gap which is provided between the ground plate and the wall or between the ground plate and the external mounting post. With this, high gas concentrations inside the casing of the gas station in case of a leaking gas station can be avoided, which further increases the safety of the gas station.

According to a preferred aspect of the present invention the ground plate is defined as a multifunctional element providing one or more of the following functions: attachment of the gas regulation device thereon, so that the gas regulation device may be preassembled on the ground plate, attachment to the wall or to the mounting post, attachment of the cover element in such a way that the cover element is securely locked thereon, serving, while being made of an insulating material, as an insulating shield against charges, which might otherwise be transmitted from the wall or from the mounting post onto the gas regulation device, having ventilation means for any leakage gas to be guided out of the casing. By providing these functions via the ground plate, a compact design of the gas station can be maintained while simplifying the assembly and the maintenance of the gas station and enabling fast and secure access to all components of the regulation device.

In an embodiment, the cover element has a box-shape or a bowl-shape, so that when the cover element is detached from the ground plate, the gas regulation device with its components is accessible from four sides, namely from a front side, from a top side, from a left side and from a right side. In general, the cover element may have four or five walls facing in four or five different directions, whereas a side facing in the other direction(s) is open (as such; in the end to be closed by the ground plate).

The casing may comprise an alternative or additional ventilation opening between the cover element and the ground plate. Accumulation of gas up to dangerous concentrations in the casing can thus be avoided, while at the same time specific venting passages are provided.

The gas regulation device may comprise at least a gas regulator and a filter as main components; each component may have a standard flange portion towards the following component which has a similar flange portion, so that each of the main components can easily be demounted, serviced or exchanged. This yields a modular layout of the gas station which improves maintainability and simplifies maintenance procedure, since individual components can be easily dismounted and reassembled.

Furthermore, an inlet valve and/or an outlet valve may have a standard flange towards its next components of the gas regulation device, such that inlet valve and/or outlet valve can easily be exchanged. This also contributes to a simplified maintenance procedure. Also, the gas station can easily be adapted to another system of incoming or outgoing gas tubes, for example when gas tubes are changed from incoming or outgoing metal gas tubes to polyethylene incoming or outgoing gas tubes.

An edge portion of the cover element and a corresponding edge portion of the ground plate may comprise complementary protrusions and recesses, respectively, for positioning and/or holding the cover element on the ground plate. Hence, a fast, simple and reliable connection of the cover element with the ground plate can be achieved.

A connection cover element may be provided for covering a connection portion of incoming and outgoing gas tubes. Such connection cover element may be box-shaped. The connection cover element may extend between the cover element and a ground surface.

A bottom of the casing, in particular a bottom of the cover element, may comprise at least one opening for connecting the gas station to incoming and/or outgoing gas tubes.

BRIEF DESCRIPTION OF THE DRAWINGS

The following figures show an embodiment of the invention. Hereby show.

DESCRIPTION OF THE INVENTION

Figure 1:
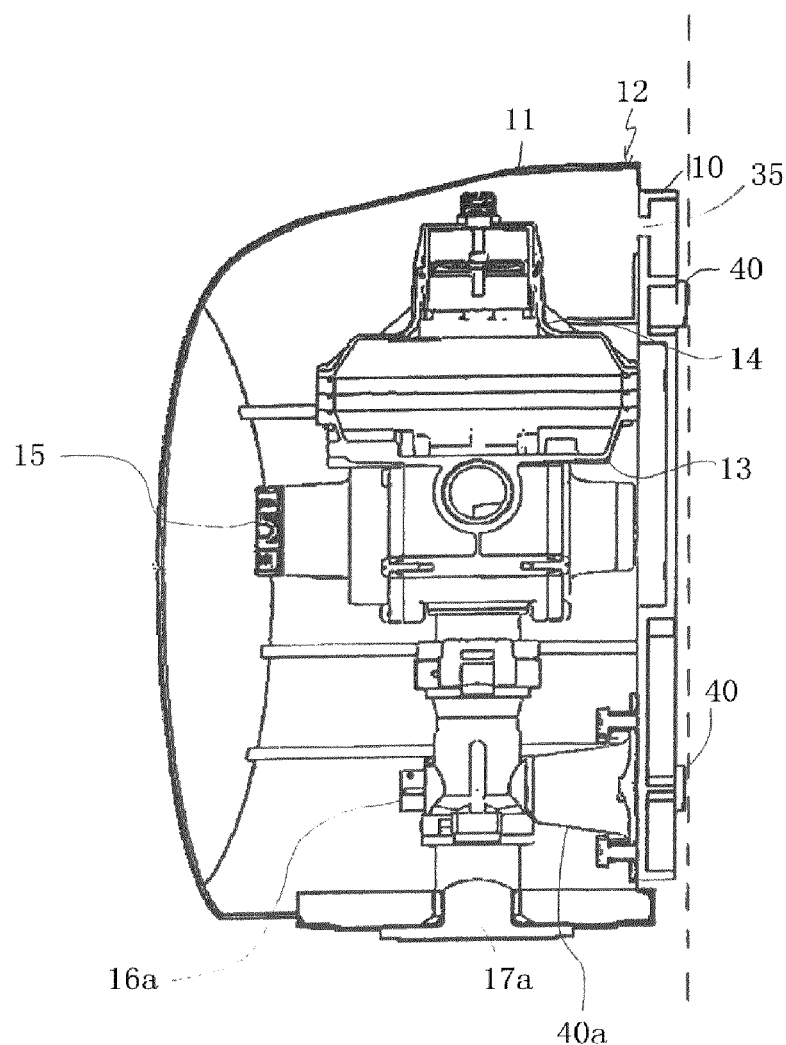
FIG. 1: A cross-sectional view of the gas station.

FIG. 1 shows a cross-sectional view of the gas station. The gas station comprises a ground plate 10 and a cover element 11 forming a casing 12. Within the casing 12, a regulation device 13 is located, the regulation device 13 comprises (inter alia) a gas regulator 14, several valves (of which an inner safety valve is located at reference sign 15 and an isolation valve is located at reference sign 16a). At the connection portion 17a, a delivery line (not shown) may be connected. A dashed line indicates the position of a wall, to which the gas station may be mounted.

Ventilation means 35 are provided by means of apertures in the ground plate 10. The ventilation means 35 may be provided as holes or slits in the ground plate 10. While the location of the ventilation means 35 on the ground plate 10 is not particularly limited, it is preferable to provide the ventilation means 35 in an upper part of the casing 12, so that uprising gas can exit the casing 12 without accumulating in a top part thereof.

Figure 2:
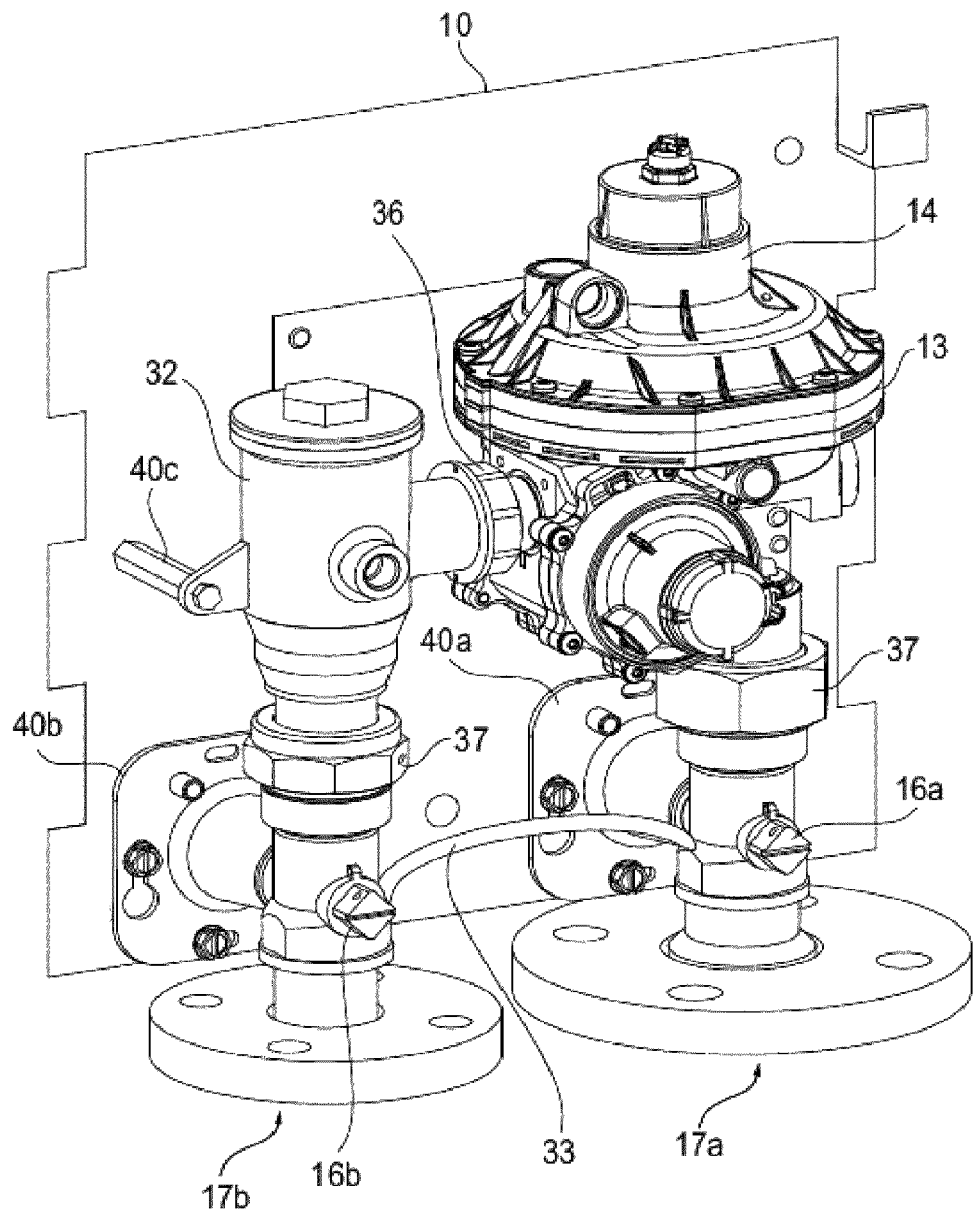
FIG. 2: A front view of the gas station with a removed cover element.

FIG. 2 shows a front view of the gas station with the cover element 11 removed. It can be seen that the regulation device 13 may further comprise a general valve 16b and a cartridge filter 32 (optionally with test point; not shown). Further shown is a dielectric link insulation 33 connecting the valves 16a and 16b. A further connection portion 17b in addition to the connection portion 17a may be provided to establish a second connection, e.g. a gas inlet or outlet. The connection portions 17a and 17b are therefore provided with standard flanges, so that an easy connection with gas inlet or outlet pipes can be accomplished. If a change in gas tube standards occurs, e.g., when switching from metal tubes for gas delivery to polyethylene tubes for gas delivery, it is conceivable that connecting elements of the tubes might also be changed. In this case, it will not be necessary to replace the complete gas station, but merely the corresponding connection portions 17a and/or 17b.

The different components of the regulation device 13 are connected at appropriately dimensioned flange portions 36, 37. With this layout, a flexible design of the regulation device 13 can be achieved. Individual components may be easily exchanged by disconnecting them at the flange portions 36, 37. This also allows for the mounting of additional or alternative components such as a manometer. Also, it is conceivable that the cartridge filter 32 may have to be exchanged regularly after a predetermined time period, e.g. after two years. Also, the gas regulator 14 may have to be exchanged after a predetermined time period, e.g. after five years. With the modular layout of the regulation device 13, such operations may be reliably and simply performed.

The regulation device 13 is attached to the ground plate 10 with several attachment means 40a, 40b, 40c, as shown in FIGS. 1 and 2 and thus mounted within the casing 12. This allows a (partial) preassembly of the regulation device 13 in the factory, so that the (partially) preassembled regulation device 13 may be mounted within the casing 12 upon installation. Also, it is possible to exchange single or multiple components after installation. The ground plate 10 secures the attachment of the regulation device 13 in the casing 12.

From FIG. 2, it can be appreciated that the regulation device 13 is accessible from at least four sides when removing the cover element 11. This further alleviates the maintenance of the regulation device 13, since all components are easily accessible from multiple sides.

The ground plate 10 is made of an insulating material, so it acts as insulator, preventing electric charges from reaching the regulation device 13. For the same reason, the cover element 11 may be manufactured of an insulating material like plastic as well. As can be seen in FIGS. 1 and 2, the ground plate 10 is (generally) flat, whereas the cover element 11 has a box-shape or a bowl shape, respectively. The ground plate 10 may thus serve as a connecting element for mounting the gas station to a wall.

Figure 3:
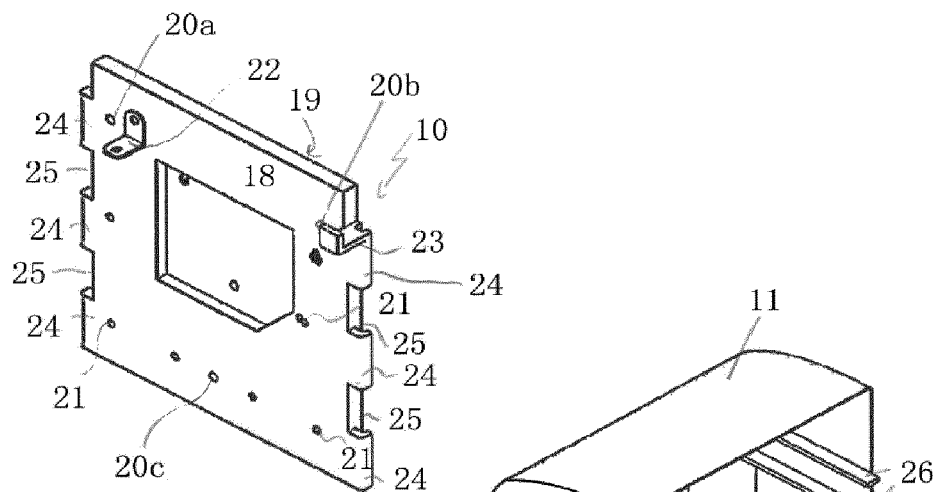
FIG. 3: An oblique view of a ground plate
Figure 5:
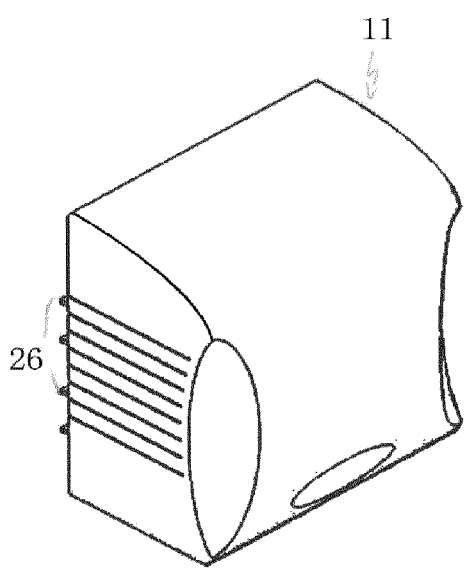
FIG. 5: A second oblique view of the cover element
Figure 4:
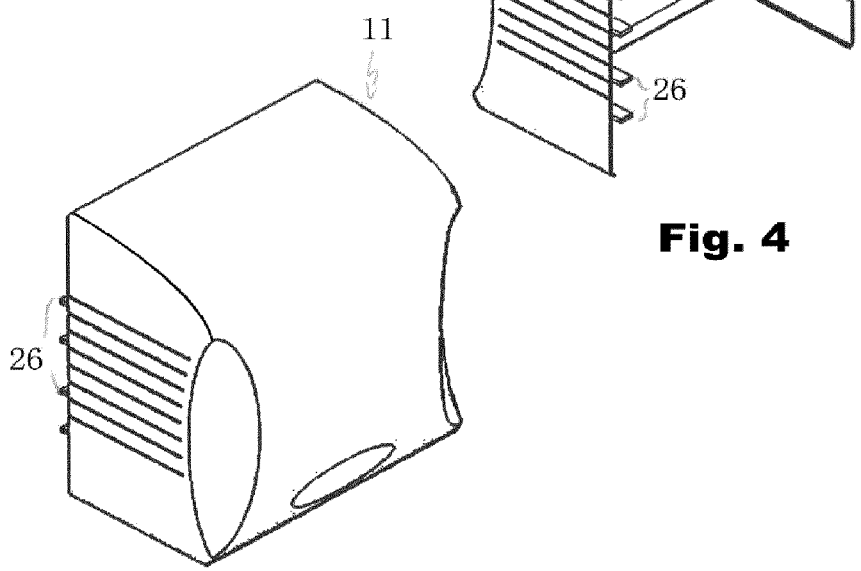
FIG. 4: A first oblique view of a cover element

In FIG. 3, the ground plate 10 is shown in an oblique view. The ground plate 10 has an inner side 18 facing a cover element 11 and an outer side 19 facing the wall (in use). Furthermore, the ground plate 10 comprises three mounting screw holes 20a, 20b and 20c into which screws (not shown in FIG. 3) can be inserted in order to attach the ground plate 10 (and hence the gas station) to a wall. Further holes 21 or recesses, respectively, are shown. These recesses/holes 21 can be used for mounting the regulation device 13 onto the ground plate 10. Similarly, a flap 22 defines a general support structure for supporting the regulation device 13 and/or the cover element 11 and/or another element. A hook 23 allows the cover element 11 shown in FIGS. 4 and 5 to be hooked in the ground plate 10 (to be described later).

Moreover, the ground plate 10 comprises projections 24 with recesses 25 in between that can be engaged with (rib-like) projections 26 (see FIG. 5) of the cover element 11. The projections 24, the recesses 25 and the projections 26 allow an accurate positioning and reliable mounting of the cover element 11 on the ground plate 10.

Figure 6:
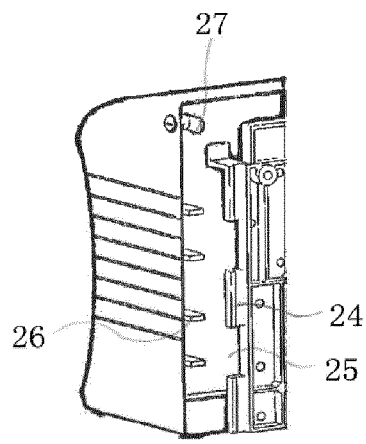
FIG. 6: A portion of the gas station in a first position.
Figure 7:
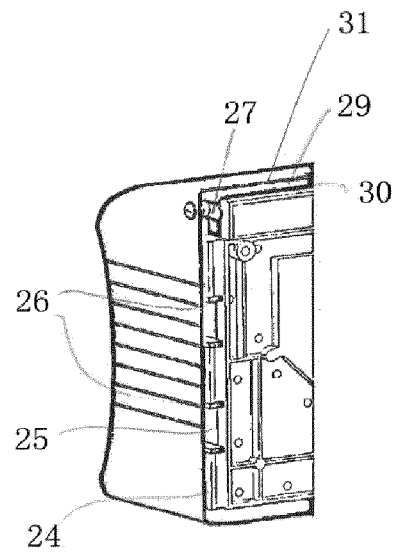
FIG. 7: The portion of FIG. 6 in a second position

In FIGS. 6 and 7, the mounting and locking procedure of the cover element 11 on the ground plate 10, is described. In FIG. 6, the cover element 11 is moved towards the ground plate 10. A locking element 27 is in the unlocked state. According to FIG. 8, the cover element 11 and the ground plate 10 are in engagement. However, the locking element 27 is still in the unlocked state.

As can be seen in FIG. 6, the (rib-like) projections 26 define guiding surfaces which simplify the connection process when the cover element 11 is moved towards the ground plate 10.

Figure 8:
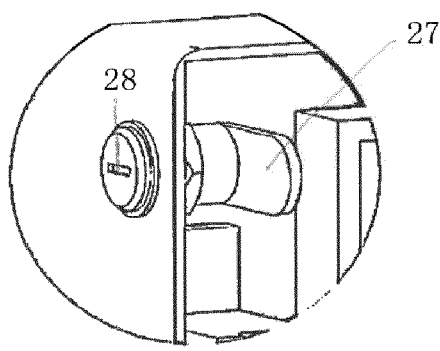
FIG. 8: An enlarged portion of FIG. 7.
Figure 9:
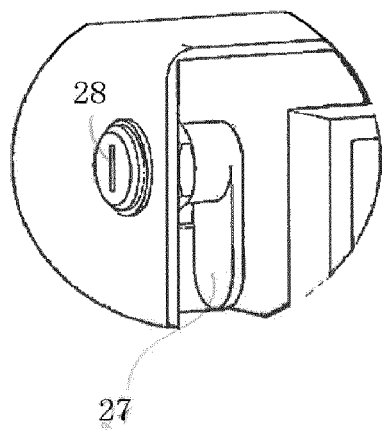
FIG. 9: The enlarged portion of FIG. 8 in a second position

FIG. 8 shows an enlarged portion of FIG. 7 (the locking element 27 being in an unlocked state). As can be seen in FIG. 9 by rotating a key in a key hole 28, the locking element 27 is transferred to its locked state so that the cover element 11 cannot be removed from the ground plate 10 (without using the key for the key hole 28).

In FIG. 7, a ventilation hole 29 (ventilation slot) can be seen which is defined by an edge portion 30 of the ground plate 10 and a corresponding (inner) edge portion 31 of the cover element. This ventilation hole 29 ensures that gas that may be leaking from a defect regulation device 13 may not be accumulated in the casing 12. The ventilation hole 29 may be provided additionally or alternatively to the ventilation means 35 shown in FIG. 1. The ventilation hole 29 may have a width of 1-2 mm.

Ventilation of the casing 12 can be further improved by attaching the ground plate 10 to the wall in a way that a gap between the wall and the ground plate 10 remains. In order to achieve this, spacers 41 may be provided on the outer side 19 of the ground plate, so that a gap remains between the ground plate 10 and the wall when the gas station is attached to the wall.

Figure 10:
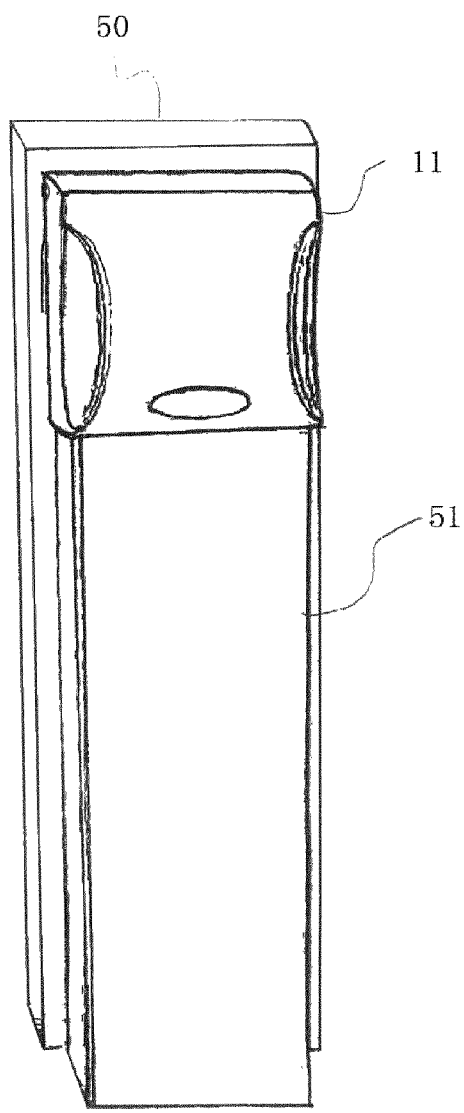
FIG. 10: A perspective view of the gas station mounted on a mounting post.

In the description above, it has been assumed that the gas station will be attached to a wall. It is also possible to mount the gas station on a mounting post 50. Such a configuration is shown in FIG. 10. The gas station is shown with attached cover element 11, being mounted to a mounting post 50. Tubes for gas delivery (that are connected to the connection portions 17a and 17b of the regulation device 13 inside the casing 12) are enclosed in a connection cover element 51 that is provided below the gas station. The mounting post 50 may be provided on a sidewalk, near a building to which gas is to be provided.

Figure 11:
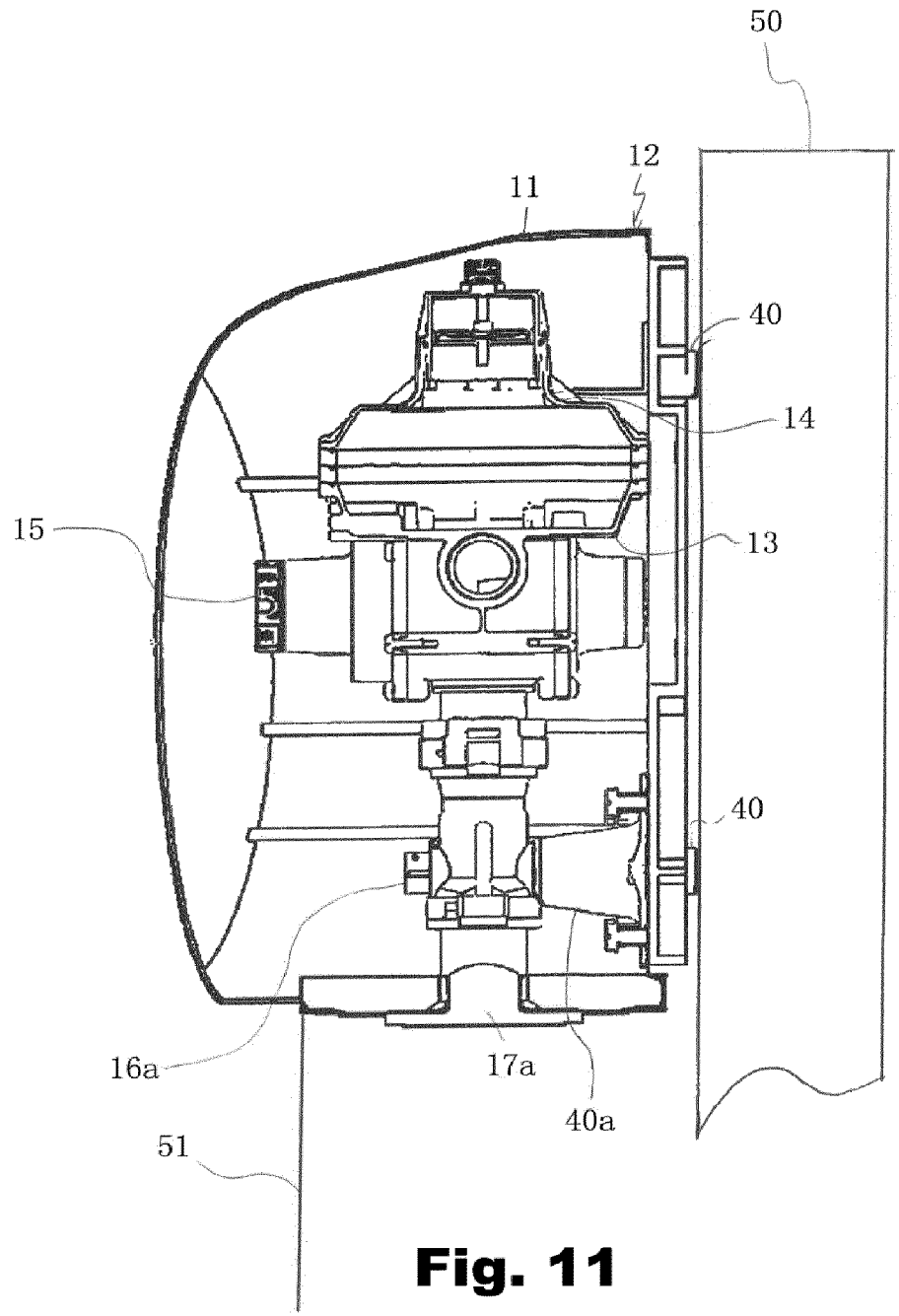
FIG. 11: A cross-sectional view of the gas station mounted to a mounting post.

FIG. 11 shows a sectional view of the gas-station in FIG. 10. For improved ventilation, spacers 40 are provided between the ground plate 10 of the gas station and the mounting post 50.

From FIG. 10 it can be seen that the casing 12 of the gas station has a bigger width than the mounting post 50, so that the casing 12 protrudes beyond the mounting post 50. Also, the front part of the cover element 11 protrudes beyond the mounting post 50, as shown in FIG. 11. Thus, an overall compact design of the gas station is realized.

The gas station and/or the casing may have a length and/or height and/or width of at least 8 cm, in particular at least 12 cm and/or not more than 30 cm, preferably not more than 20 cm.

The gas station and/or the casing may have a volume of at least 500 cm$^3$, in particular at least 1700 cm$^3$ and/or not more than 2700 cm$^3$, preferably not more than 8000 cm$^3$.

The gas station according to this invention may be used as a regulation device for the supply of gas to individual households, where a typical gas flow of 1.5 m$^3$/h may be expected. However, it is also possible to employ the gas station according to this invention for establishing a gas supply to houses with several apartments, or larger commercial accommodations. It may be conceivable to apply the gas station for supplying gas to 50-1000 apartments. The gas station may be designed to provide flow rates of 25-100 m$^3$/h.

REFERENCE NUMERALS

10 Ground plate
11 Cover element
12 Casing
13 Regulation device
14 Gas regulator
15 Safety valve
16a Valve
16b Valve
17a Connection portion
17b Connection portion
18 Inner side
19 Outer side
20a Mounting screw hole
20b Mounting screw hole
20c Mounting screw hole
21 Recess/hole
22 Flap
23 Hook
24 Projection
25 Recess
26 Projection
27 Locking element
28 Key hole
29 Ventilation hole
30 Edge portion
31 Edge portion
32 Cartridge filter
33 Dielectric link insulation
34 Gap
35 Ventilation means
36 Flange portion
37 Flange portion
38 Flange
39 Flange
40a Attachment means
40b Attachment means
40c Attachment means
41 Spacer
50 Mounting post
51 Connection cover element

What is claimed is:

1. A gas station for delivery of gas to appliances, in particular in a building, the gas station comprising a casing and a gas regulation device with several components comprising at least a gas regulator and a filter, wherein the gas regulation device is mounted or mountable within the casing, wherein the casing comprises a ground plate and a cover element being securable or secured onto the ground plate, wherein the ground plate is configured for mounting to a wall or to an external mounting post, wherein the ground plate comprises at least one spacer, so that the ground plate is attached to the wall or to the external mounting post in such a way that a predefined gap is maintained between the ground plate and the wall or between the ground plate and the mounting post, wherein the ground plate includes a flap and a hook, wherein the flap supports the gas regulation device and the cover element, wherein the hook is integral to the ground plate, and wherein the hook is configured to hook the cover element in the ground plate via a locking element comprising a key hole, which when rotated, transfers the locking element from a locked state to an unlocked state to removably attach the cover element to the ground plate.

2. The gas station of claim 1, wherein the ground plate is provided as an attachment basis for the gas regulation device further comprising at least one valve and/or at least one manometer and/or at least one dielectric link insulation, so that the gas regulation device may be preassembled on the ground plate.

3. The gas station of claim 1, wherein the ground plate comprises at least one hole for screwing the gas station on the wall or on the external mounting post.

4. The gas station of claim 1, wherein the cover element is securely attached and locked, or securely attachable and lockable, onto the ground plate.

5. The gas station of claim 1, wherein the ground plate is made of plastic to insulate the gas regulation device from electric charges which might otherwise be transmitted from the wall or the external mounting post onto the gas regulation device.

6. The gas station of claim 1, wherein the ground plate comprises ventilation means to guide any leakage gas in the gap which is provided between the ground plate and the wall or between the ground plate and the external mounting post.

7. The gas station of claim 1, wherein the ground plate is defined as a multifunctional element providing:
attachment of the gas regulation device thereon, so that the gas regulation device may be preassembled on the ground plate.

8. The gas station of claim 1, wherein the ground plate is defined as a multifunctional element providing:
attachment of the cover element in such a way that the cover element is securely locked thereon.

9. The gas station of claim 1, wherein the ground plate is made of an insulating material and provides an insulating shield against electric charges, which might otherwise be transmitted from the wall or from the mounting post onto the gas regulation device.

10. The gas station of claim 1, wherein the ground plate comprises ventilation means for guiding any leakage gas out of the casing.

11. The gas station of claim 1, wherein the cover element has a box-shape or a bowl-shape, so that when the cover element is detached from the ground plate, the gas regulation device with its components is accessible from four sides, namely from a front side, from a top side, from a left side, and from a right side.

12. The gas station of claim 1, wherein the casing comprises an alternative or additional ventilation opening between the cover element and the ground plate.

13. The gas station of claim 1, wherein the gas regulation device comprises a gas regulator and the filter as main components and that each of the main components has a standard flange portion towards a following component which has a similar flange portion, so that each of the main components can easily be demounted, serviced, or exchanged.

14. The gas station of claim 1, wherein an inlet valve has a standard flange towards its next components of the gas regulation device, such that the inlet valve can easily be exchanged.

15. The gas station of claim 1, wherein an outlet valve has a standard flange towards its next components of the gas regulation device, such that the outlet valve can easily be exchanged.

16. The gas station of claim 1, wherein an edge portion of the cover element and a corresponding edge portion of the ground plate comprise complementary protrusions and recesses, respectively, for positioning and/or holding the cover element on the ground plate.

17. The gas station of claim 1, wherein a connection cover element is provided, for covering a connection portion of a gas delivery line.

18. The gas station of claim 1, wherein the filter is a cartridge filter.

19. A gas station for delivery of gas to appliances, in particular in a building, the gas station comprising a casing and a gas regulation device with several components comprising at least a gas regulator and a filter, wherein the gas regulation device is mounted or mountable within the casing, wherein the casing comprises a ground plate and a cover element being securable or secured onto the ground plate, wherein the ground plate is configured for mounting to a wall or to an external mounting post, wherein the ground plate includes a flap and a hook, wherein the ground plate is provided as attachment basis for the gas regulation device further comprising at least one valve and/or at least one manometer and/or at least one dielectric link insulation, so that the gas regulation device may be preassembled on the ground plate, wherein the flap supports the gas regulation device and the cover element, wherein the hook is integral to the ground plate, and wherein the hook is configured to hook the cover element in the ground plate via a locking element comprising a key hole, which when rotated, transfers the locking element from a locked state to an unlocked state to removably attach the cover element to the ground plate.

20. A gas station for delivery of gas to appliances, in particular in a building, the gas station comprising a casing and a gas regulation device with several components comprising at least a gas regulator and a filter, wherein the gas regulation device is mounted or mountable within the casing, wherein the casing comprises a ground plate and a cover element being securable or secured onto the ground plate, wherein the ground plate comprises ventilation means for guiding any leakage gas out of the casing, wherein the ground plate is configured for mounting to a wall or to an external mounting post, wherein the ground plate includes a flap and a hook, wherein the flap supports the gas regulation device and the cover element, wherein the hook is integral to the ground plate, and wherein the hook is configured to hook the cover element in the ground plate via a locking element comprising a key hole, which when rotated, transfers the locking element from a locked state to an unlocked state to removably attach the cover element to the ground plate.

* * * * *